United States Patent
Ishizuka et al.

(10) Patent No.: US 10,821,984 B2
(45) Date of Patent: Nov. 3, 2020

(54) GEAR SHIFT CONTROL DEVICE AND GEAR SHIFT CONTROL METHOD FOR CONTINUOUSLY VARIABLE TRANSMISSION

(71) Applicant: JATCO LTD, Fuij-shi, Shizuoka (JP)

(72) Inventors: Mitsuki Ishizuka, Aichi (JP); Tomoaki Kabe, Aichi (JP); Nobuhiko Morifuji, Aichi (JP); Hitoshi Goka, Aichi (JP); Takayuki Ogata, Aichi (JP)

(73) Assignee: Jatco Ltd., Fuji-shi (JP)

( * ) Notice: Subject to any disclaimer, the term of this patent is extended or adjusted under 35 U.S.C. 154(b) by 0 days.

(21) Appl. No.: 16/328,874

(22) PCT Filed: Nov. 20, 2017

(86) PCT No.: PCT/JP2017/041667
§ 371 (c)(1),
(2) Date: Feb. 27, 2019

(87) PCT Pub. No.: WO2018/092903
PCT Pub. Date: May 24, 2018

(65) Prior Publication Data
US 2019/0210605 A1    Jul. 11, 2019

(30) Foreign Application Priority Data
Nov. 21, 2016   (JP) ................. 2016-226157

(51) Int. Cl.
*B60W 10/107* (2012.01)
*B60W 30/19* (2012.01)
(Continued)

(52) U.S. Cl.
CPC ............ *B60W 30/19* (2013.01); *B60W 10/04* (2013.01); *B60W 10/06* (2013.01);
(Continued)

(58) Field of Classification Search
CPC ............. Y10T 477/619; Y10T 477/675; Y10T 477/677; F16H 61/66254; F16H 63/50;
(Continued)

(56) References Cited

U.S. PATENT DOCUMENTS 6,322,478 B1 * 11/2001 Jackson ............... B60W 10/06
477/109
9,150,213 B2 * 10/2015 Ishikawa ............... B60W 10/06
(Continued)

FOREIGN PATENT DOCUMENTS

JP   2015-034595 A   2/2015
JP   2016-166647 A   9/2016

*Primary Examiner* — Roger L Pang
(74) *Attorney, Agent, or Firm* — Global IP Counselors, LLP (57) ABSTRACT

A gear shift control device for a continuously variable transmission of a vehicle is configured to steplessly and continuously change and output a rotation speed of an engine. The gear shift control device includes a gear shift control unit and a torque control command unit. The gear shift control unit is configured to implement a pseudo-stepped upshift control to change a gear shift ratio in steps when upshifting the continuously variable transmission. The torque control command unit is configured to output a torque reduction command so as to reduce an engine torque in conjunction with the pseudo-stepped upshift control so that reduction of the engine torque starts before a point in time when an actual gear shift ratio starts changing in response to an upshift command.

6 Claims, 3 Drawing Sheets

(51) Int. Cl.
*B60W 10/06* (2006.01)
*F16H 61/662* (2006.01)
*F16H 63/50* (2006.01)
*B60W 10/101* (2012.01)
*B60W 10/04* (2006.01)
*F02D 41/02* (2006.01)
*F16H 61/66* (2006.01)
*F16H 61/02* (2006.01)
*F16H 37/02* (2006.01)

(52) U.S. Cl.
CPC ........ *B60W 10/101* (2013.01); *B60W 10/107* (2013.01); *F02D 41/023* (2013.01); *F16H 61/02* (2013.01); *F16H 61/66* (2013.01); *F16H 61/662* (2013.01); *F16H 63/50* (2013.01); *B60W 2510/1005* (2013.01); *B60W 2510/1095* (2013.01); *B60W 2710/0666* (2013.01); *B60W 2710/1005* (2013.01); *F02D 2400/12* (2013.01); *F16H 37/022* (2013.01); *F16H 2037/026* (2013.01); *F16H 2061/6611* (2013.01); *Y10T 477/619* (2015.01); *Y10T 477/675* (2015.01); *Y10T 477/677* (2015.01)

(58) Field of Classification Search
CPC .................. F16H 61/66; F16H 61/662; F16H 2061/6611; F16H 2061/6615; F16H 61/04; B60W 60/19; B60W 10/101; B60W 10/06; B60W 10/107; B60W 2510/1005; B60W 2710/0666; B60W 2710/1005; F02D 41/023; F02D 2400/12
See application file for complete search history.

(56) References Cited

U.S. PATENT DOCUMENTS 9,545,929 B1\* 1/2017 Zhang ................. B60W 30/188
2017/0225683 A1\* 8/2017 Jiang .................... B60W 30/18

\* cited by examiner

GEAR SHIFT CONTROL DEVICE AND GEAR SHIFT CONTROL METHOD FOR CONTINUOUSLY VARIABLE TRANSMISSION

CROSS-REFERENCE TO RELATED APPLICATIONS

This is a U.S. national phase application of PCT/JP2017/041667, filed on Nov. 20, 2017, which claims priority to Japanese Patent Application No. 2016-226157, filed on Nov. 21, 2016. The entire disclosure of Japanese Patent Application No. 2016-226157 is hereby incorporated herein by reference.

TECHNICAL FIELD

The present invention relates to a gear shift control device and a gear shift control method for a continuously variable transmission equipped in a vehicle.

BACKGROUND ART

For automatic transmissions equipped in vehicles, there are stepped transmissions and continuously variable transmissions. Continuously variable transmissions can continuously control gear shifting, specifically, the change in the gear shift ratio, so they are characterized by a smooth gear shift feeling. On the other hand, stepped transmissions perform gear shifting in steps by switching of the clutch, so this is characterized by a snappy gear shift feeling.

With the continuously variable transmission as well, when the rotation of a drive source such as an engine, etc., is at the high rotation side, there is also a demand to be able to obtain a snappy gear shift feeling like that of a stepped transmission.

In response to this kind of demand, for example in Patent Document 1, proposed is a gear shift control device for a continuously variable transmission that, in addition to a normal gear shift mode for smoothly changing a gear shift ratio steplessly, is also equipped with a gear shift mode that controls the gear shift ratio so as to increase the vehicle speed while repeating gradual increase and rapid decrease of the engine rotation speed by changing the gear shift ratio in steps as if it were a stepped transmission (hereafter called "pseudo-stepped upshift mode").

With the gear shift control device of Patent Document 1, the vehicle speed is increased while repeating holding and upshifting of the gear shift ratio. Also, in cooperation with upshifting from the upshift start point, torque reduction cooperation that reduces the engine torque by an amount of the inertia torque that occurs during upshifting is implemented.

However, it was found that even when the abovementioned pseudo-stepped upshift mode is applied to the continuously variable transmission, a snappy gear shift feeling such as with the stepped transmission cannot be sufficiently obtained.

This is thought to be because with the stepped transmission, a reduction of output torque is implemented from the torque phase while the process progresses from the torque phase to the inertia phase, and this torque reduction gives a snappy feeling by giving a temporary decrease (pullback) of the vehicle forward-reverse direction acceleration level (vehicle forward-reverse G), with the continuously variable transmission, only torque reduction cooperative control to negate the inertia torque from the inertia phase is implemented, so it is not possible to generate the desired pullback of the vehicle forward-reverse G.

The present invention was created considering this kind of problem, and its purpose is to provide a gear shift control device for a continuously variable transmission that makes it possible to obtain the snappy gear shift feeling like that of a stepped transmission by applying a pseudo-stepped upshift mode to the continuously variable transmission.

PRIOR ART DOCUMENT

Patent Document

[Patent Document 1] Japanese Laid-Open Patent Publication No. 2015-34595

SUMMARY OF THE INVENTION (1) A gear shift control device for a continuously variable transmission of the present invention is the gear shift control device for a continuously variable transmission, equipped in a vehicle, for steplessly and continuously performing gear shifting of a rotation speed of an engine and outputting, comprising: a gear shift control means for implementing a pseudo-stepped upshift control for changing a gear shift ratio in steps when upshifting the continuously variable transmission, and a torque control command means for giving a command so as to reduce an engine torque in conjunction with the pseudo-stepped upshift control, wherein the torque control command means implements a torque reduction command so that the reduction of torque of the engine starts before the point in time when the upshifting actually starts.

(2) It is preferable that the start timing of the upshift command and the start timing of the torque reduction command are set so that reduction of the engine torque starts by a first prescribed time before the point in time when the upshifting actually starts, according to a response time from the upshift command until the upshifting actually starts, and the response time from the torque reduction command to the engine until the torque reduction of the engine actually starts.

(3) It is preferable that the torque reduction amount when giving the torque reduction command is a prescribed torque reduction amount that is greater than the inertia torque amount generated during the upshifting.

(4) It is preferable that the greater the load demand of the engine immediately prior to the upshifting, the greater the prescribed torque reduction amount is set.

(5) It is preferable that the torque reduction command of the engine includes: a first command for decreasing the command torque in step form by the prescribed torque reduction amount and holding for a second prescribed time; and thereafter, a second command for, after increasing the command torque in step form by a minute prescribed torque increase amount, gradually increasing and returning the engine torque to the torque according to the load demand of the engine.

With the present invention, when the pseudo-stepped upshift control is implemented, the gear shift feeling close to the upshift feeling of the stepped transmission is obtained by the stepped upshift of the gear shift ratio. In particular, in conjunction with the pseudo-stepped upshift control, engine torque reduction is performed so as to start a reduction in the engine torque before the point in time when the upshifting actually starts, so a change in the vehicle forward-reverse G close to the pullback (decrease) in the vehicle forward-reverse G that occurs due to torque reduction of the engine in the torque phase of upshifting of the stepped transmission occurs, and it is possible to give the driver a snappy sense close to the upshift sense of the stepped transmission.

MODES FOR CARRYING OUT THE INVENTION

Following, an embodiment of the present invention is explained while referring to the drawings. The embodiment shown hereafter is nothing more than an example, and is not intended to exclude various modifications and technical applications not explicitly shown in the embodiment below. Each configuration of the embodiment below can be implemented with various modifications in a scope that does not stray from the gist, can be selected as necessary, or can be combined as appropriate.

[1. Overall System Configuration]

Figure 1:
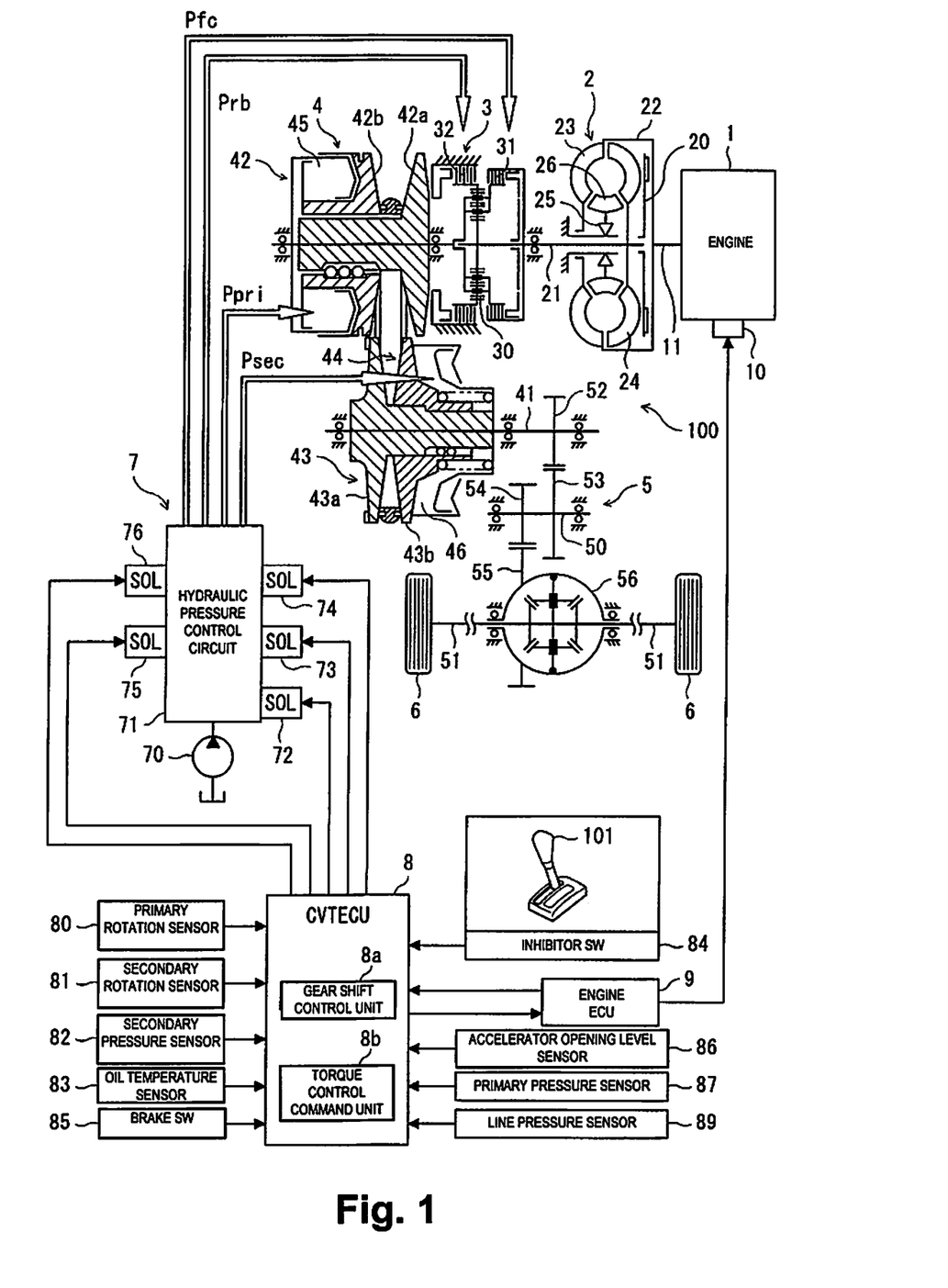
FIG. 1 is an overall system diagram showing a drive system and a control system of an engine vehicle to which is applied a gear shift control device for a continuously variable transmission of an embodiment of the present invention.

FIG. 1 is a configuration drawing showing a drive system and a control system of a vehicle of this embodiment.

As shown in FIG. 1, the drive system of the vehicle comprises an engine (internal combustion engine) 1, a torque converter 2, a forward/reverse switching mechanism 3, a belt type continuously variable transmission mechanism (automatic transmission mechanism) 4, a final reduction mechanism 5, and drive wheels 6, 6. A belt type continuously variable transmission (hereafter also referred to as "CVT") 100 is configured by housing the torque converter 2, the forward/reverse switching mechanism 3, the belt type continuously variable transmission mechanism (hereafter also referred to as "variator") 4, and the final reduction mechanism 5 inside a transmission case.

Equipped in the engine 1 is an output torque control actuator 10 for performing output torque control by a throttle valve open/close operation, fuel cutting operation, etc. As a result, the engine 1, in addition to control of output torque according to an accelerator operation by a driver, is also capable of control of output torque according to another engine control signal.

The torque converter 2 is a start element having a torque amplifying element, and when the torque amplifying function is not necessary, has a lock-up clutch 20 that can directly connect an engine output shaft (=torque converter input shaft) 11 and a torque converter output shaft 21. This torque converter 2 has as constituent elements: a pump impeller 23 connected to the engine output shaft 11 with a converter housing 22 interposed; a turbine liner 24 connected to the torque converter output shaft 21; and a stator 26 provided in the case with a one way clutch 25 interposed.

The forward/reverse switching mechanism 3 is a mechanism that switches the input rotation direction to the belt type continuously variable transmission mechanism 4 between a forward direction during forward travel and a reverse direction during reverse travel. This forward/reverse switching mechanism 3 has: a double pinion type planetary gear 30; a forward clutch (forward side friction engagement element) 31 using a plurality of clutch plates; and a reverse brake (reverse side friction engagement element) 32 using a plurality of brake plates.

The forward clutch 31 is engaged by a forward clutch pressure Pfc when a forward travel range such as D range (drive range), Ds range (drive sport range), etc. is selected. The reverse brake 32 is engaged by a reverse brake pressure Prb when an R range which is a reverse travel range is selected. The forward clutch 31 and the reverse brake 32 are both released by draining the forward clutch pressure Pfc and the reverse brake pressure Prb when an N range (neutral range, non-travel range) is selected.

The belt type continuously variable transmission mechanism 4 comprises a continuously variable transmission function that steplessly changes the gear shift ratio (specifically, transmission input rotation speed/transmission output rotation speed) which is the ratio between the transmission input rotation speed and the transmission output rotation speed by changing the belt contact diameter, and has a primary pulley 42, a secondary pulley 43, and a belt 44. The primary pulley 42 is configured by a fixed pulley 42a and a slide pulley 42b, and the slide pulley 42b moves in the axis direction by a primary pressure Ppri guided to a primary pressure chamber 45. The secondary pulley 43 is configured by a fixed pulley 43a and a slide pulley 43b, and the slide pulley 43b moves in the axis direction by a secondary pressure Psec guided to a secondary pressure chamber 46.

Sheave surfaces that are each a facing surface of the fixed pulley 42a and the slide pulley 42b of the primary pulley 42, and sheave surfaces that are each the facing surface of the fixed pulley 43a and the slide pulley 43b of the secondary pulley 43, all form a V shaped cross section shape, and the flank surface of both sides of the belt 44 are in contact with each of these sheave surfaces. The gear shift ratio is changed by changing of the winding radius of the belt 44 on the primary pulley 42 and the secondary pulley 43 according to the movement of the slide pulleys 42b, 43b.

The final reduction mechanism 5 is a gear mechanism for reducing transmission output rotation from a transmission output shaft 41 of the belt type continuously variable transmission mechanism 4, and between the transmission output shaft 41, an idler shaft 50, and left and right drive shafts 51, 51, has a first gear 52, a second gear 53, a third gear 54, and a fourth gear 55 having a deceleration function. A differential gear 56 having a differential function is equipped as a single unit in the final reduction mechanism 5.

As shown in FIG. 1, of control systems of a vehicle, in particular the control system of the CVT 100 comprises a hydraulic pressure control unit 7, and a CVT electronic control unit (gear shift control device, hereafter called CVTECU) 8. Also, equipped is an engine electronic control unit (hereafter called engine ECU) 9 that exchanges information with this CVTECU 8. Each electronic control unit (ECU: Electronic Control Unit) 8, 9 is configured comprising an input/output device, a storage device (ROM, RAM, etc.) with a large number of control programs built in, a central processing unit (CPU), a timer counter, etc.

The hydraulic pressure control unit 7 is a control unit that creates the primary pressure Ppri guided to the primary pressure chamber 45, the secondary pressure Psec guided to the secondary pressure chamber 46, the forward clutch pressure Pfc to the forward clutch 31, and the reverse brake pressure Prb to the reverse brake 32. This hydraulic pressure control unit 7 comprises an oil pump 70 and a hydraulic pressure control circuit 71. The hydraulic pressure control circuit 71 has: a line pressure solenoid 72, a primary pressure solenoid 73, a secondary pressure solenoid 74, a forward clutch pressure solenoid 75, and a reverse brake pressure solenoid 76.

The line pressure solenoid 72 does pressure regulation of hydraulic oil pressure fed from the oil pump 70 to a line pressure PL according to line pressure instructions output from the CVTECU 8.

The primary pressure solenoid 73 does pressure reduction regulation to the primary pressure Ppri instructed with the line pressure PL as the source pressure according to the primary pressure instruction output form the CVTECU 8.

The secondary pressure solenoid 74 does pressure reduction regulation to the secondary pressure Psec instructed with the line pressure PL as the source pressure according to the secondary pressure instruction output from the CVTECU 8.

The forward clutch pressure solenoid 75 does pressure reduction regulation to the forward clutch pressure Pfc instructed with the line pressure PL as the source pressure according to the forward clutch pressure instruction output from the CVTECU 8.

The reverse brake pressure solenoid 76 does pressure reduction regulation to the reverse brake pressure Prb instructed with the line pressure PL as the source pressure according to the reverse brake pressure instruction output from the CVTECU 8.

Various types of sensor, such as a primary rotation sensor 80, a secondary rotation sensor 81, a secondary pressure sensor 82, an oil temperature sensor 83, an inhibitor switch 84, a brake switch 85, an accelerator opening level sensor 86, a primary pressure sensor 87, a line pressure sensor 89, etc., are connected to the CVTECU 8, and sensor information and switch information detected by these sensors are input.

The primary rotation sensor 80 detects the rotation speed of the primary pulley 42 (actual primary rotation speed Npri_r). The secondary rotation sensor 81 detects the rotation speed of the secondary pulley 43 (actual secondary rotation speed).

Also, engine torque and engine speed Ne information is input to CVTECU 8 from the engine ECU 9, and the CVTECU 8 outputs a torque request to the engine ECU 9.

Also, provided on the vehicle is a shift lever (select lever) 101 for switching (selecting) the travel mode. The inhibitor switch 84 detects a range position (D range, N range, R range, etc.) selected by this shift lever 101, and outputs a range position signal according to the range position.

Specific examples of a control subject of the CVTECU 8 include line pressure control that outputs to the line pressure solenoid 72 instructions for obtaining the target line pressure according to the throttle opening level, etc., gear shift hydraulic pressure control that outputs to the primary pressure solenoid 73 and the secondary pressure solenoid 74 instructions for obtaining a target gear shift ratio according to the vehicle speed or throttle opening level, etc., a forward-reverse switching control that outputs to the forward clutch pressure solenoid 75 and the reverse brake pressure solenoid 76 instructions for controlling the engagement and release of the forward clutch 31 and the reverse brake 32, etc. With this embodiment, the gear shift control is explained, and in particular, a detailed explanation is given of pseudo-stepped upshift control.

[2. Summary of Control]
[2.1 Gear Shift Control]

Gear shift control is control that selects an appropriate gear shift mode based on, for example, an accelerator opening level AP or an accelerator opening level change rate ΔAP detected by the accelerator opening level sensor 86, the on/off of the brake switch 85, etc., and that changes the gear shift ratio of the CVT 100 according to the gear shift mode.

Here, seven gear shift modes are provided: auto upshift, foot return upshift, foot release upshift, stepping upshift, rapid stepping upshift, brake upshift, and pseudo-stepped upshift. These gear shift modes are selected according to the engine 1 load or engine rotation speed (hereafter also called engine speed) Ne, the accelerator opening level AP or the accelerator opening level change rate AAP, on/off of the brake switch 28, the vehicle speed, etc. Among these, the six gear shift modes other than the pseudo-steeped upshift are conventionally known items, so an explanation thereof is omitted.

[2-2. Pseudo-Stepped Upshift Control]

Pseudo-stepped upshift control is control that changes the gear shift ratio in steps as if it is a stepped transmission, and increases the vehicle speed while repeating gradual increase and rapid decrease of the rotation speed Ne of the engine 1. Hereafter, the gear shift mode implemented by the pseudo-stepped upshift control is called the pseudo-stepped upshift mode.

With the pseudo-stepped upshift mode, based on the accelerator opening level AP or accelerator opening level change rate ΔAP detected by the accelerator opening level sensor 86, the on/off of the brake switch 85, etc., the vehicle speed is increased while repeating holding of the gear shift ratio and relatively rapid stepped upshifting. Holding of the gear shift ratio noted here does not mean holding to a completely fixed gear shift ratio, but rather, means controlling the gear shift ratio so that the vehicle speed rise and the engine speed rise match the feeling of the driver, as with stepped transmissions.

In other words, if the gear shift ratio is controlled according to driving points determined from the gear shift map by the vehicle speed and the accelerator opening level, the gear shift ratio upshifts smoothly, but in the pseudo-stepped upshift mode, by having a state in which the gear shift ratio is not changed greatly for a certain period (a large change is not given to the gear shift ratio), and performing upshift with a large change in the gear shift ratio after that, the gear shift ratio is changed in steps. Here, the period in which the gear shift ratio is not changed greatly (maintained) is from the point at which the pseudo-stepped upshift mode is selected or from the upshift end time, until the actual primary rotation speed Npri_r reaches a prescribed upshift start rotational speed (also called the upshift start rotation speed) NpriTH.

Here, the pseudo-stepped upshift mode implemented by the pseudo-stepped upshift control is selected when all three of the following conditions 1 through 3 are satisfied.

Condition 1: The accelerator opening level AP is a prescribed threshold value ATH or greater (AP≥ATH)

Condition 2: The accelerator opening level change rate ΔAP is 0 or greater and less than a prescribed value B (0≤ΔAP<B)

Condition 3: The brake switch is off

Specifically, the pseudo-stepped upshift mode is selected when only the accelerator pedal is stepped on at a prescribed threshold value ATH or greater (size of ΔATH<B). When condition 1 is not satisfied, but condition 2 and condition 3 are satisfied, normal auto upshift is selected, and when condition 2 is not satisfied, but condition 1 and condition 3 are satisfied, stepping upshift or rapid stepping upshift, etc., is selected. Said another way, the abovementioned conditions 1 through 3 are determination conditions for whether the pseudo-stepped upshift mode is selected or a gear shift mode other than this is selected.

[3. Control Configuration]

As shown in FIG. 1, as an element for implementing control described above, provided in the CVTECU 8 is a gear shift control unit (gear shift control means) 8a, and a torque control command unit (torque control command means) 8b. Here, each of these control units uses functional elements programmed as software, but these control units can also be realized using electronic circuits (hardware), or can also be an item for which a part of these functions is provided as hardware, and the other part as software.

As described above, the gear shift control unit 8a implements control using each gear shift mode, and particularly, with the pseudo-stepped upshift mode implemented under the abovementioned conditions, as noted above, the vehicle speed is increased while repeating holding of the gear shift ratio and stepped upshift.

The torque control command unit 8b commands the engine ECU 9 to reduce the torque of the engine 1 in conjunction with the pseudo-stepped upshift control. This torque control command unit 8b implements the torque reduction command so that reduction of the torque of the engine 1 starts before the time when upshifting actually starts (here, this is earlier by a first prescribed time). Also, the torque reduction amount when giving the torque reduction command is a prescribed torque reduction amount that is greater than the inertia torque amount generated during upshifting. Also, the bigger the accelerator opening level immediately before the upshifting (load demand of the engine 1) is, the greater this prescribed torque reduction amount is set to be.

Performing the torque control so as to have the torque reduction of the engine 1 start before the point when the upshifting actually starts is in order to give a snappy sense to the driver during the pseudo-stepped upshift. With the stepped transmission, a reduction in the output torque is implemented at the torque phase immediately prior to the inertiephase, and a temporary decrease (pullback) of the vehicle forward direction acceleration level (vehicle forward-reverse G) is generated, giving the driver a snappy sense. In light of that, in imitation of this, a reduction in output torque is implemented before the point in time when the upshifting actually starts, in other words, immediately prior to the inertia phase.

Pullback of the vehicle forward-reverse G that gives the driver a snappy feeling is dependent on the timing of the torque reduction, in other words, at what point in time by what amount prior to the time when the upshifting actually starts the torque of the engine 1 is reduced, and on the size of the torque reduction amount, in other words, at what level of torque reduction amount the torque of the engine 1 is reduced.

To generate pullback of the vehicle forward-reverse G that gives a snappy sense, it is thought that a certain degree of the effect can be obtained simply by one of the timing of the torque reduction and the size of the torque reduction amount, but to give the desired snappy sense, focusing on both of these, it is effective to set a suitable value for these.

From this kind of perspective, to be able to realize pullback of the vehicle forward-reverse G so as to give the driver a snappy sense, a first prescribed time and a prescribed torque reduction amount are set. The relationship between the first prescribed time, the prescribed torque reduction amount, and the pullback of the vehicle forward-reverse G can be found through testing. In light of that, it is possible to find the first prescribed time and the prescribed torque reduction amount suitable for giving the desired snappy sense using testing, for example.

Figure 2:
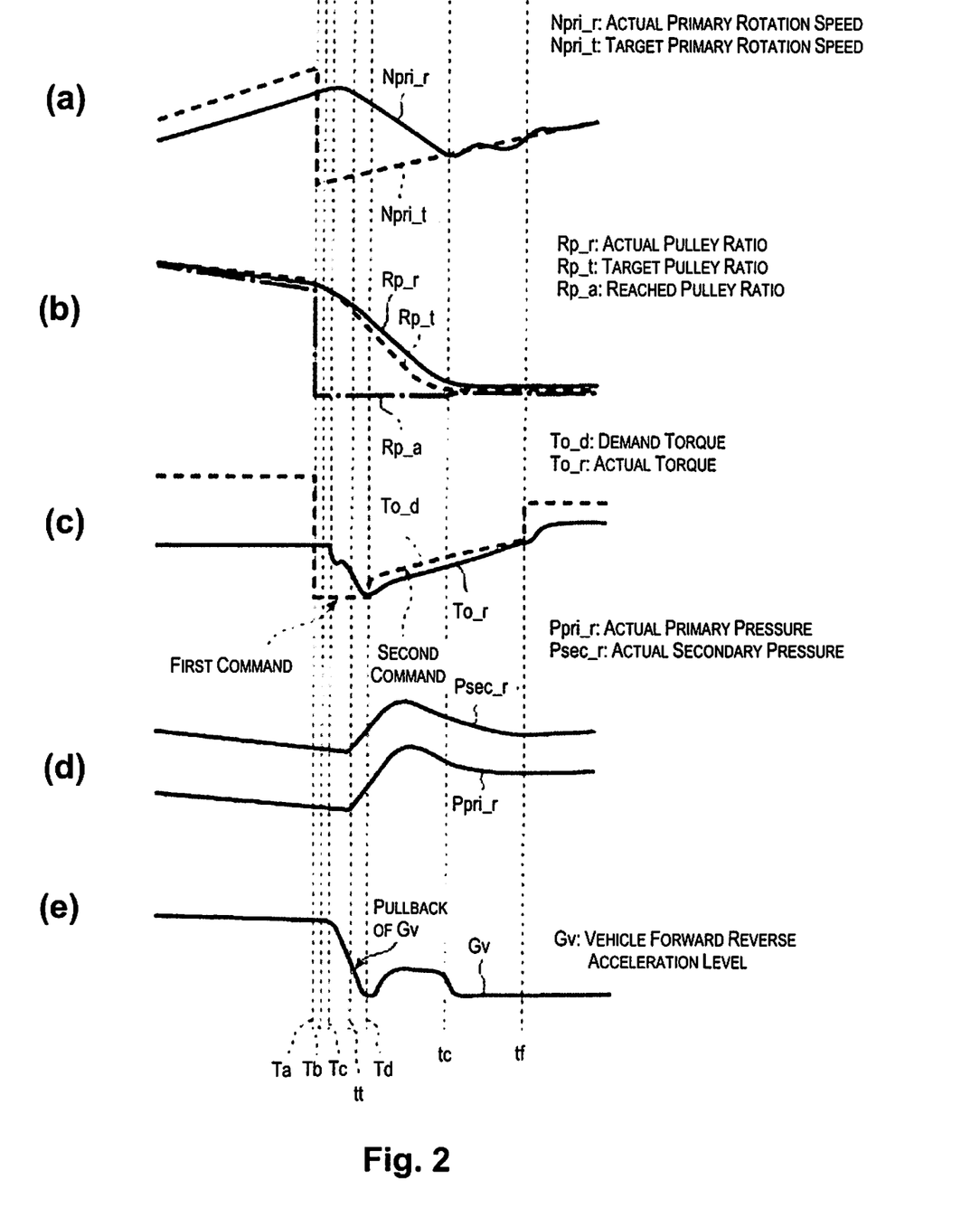
FIG. 2 is a time chart showing an example of the contents of pseudo-stepped upshift control and engine torque reduction control of an embodiment of the present invention.

Here, referencing FIG. 2, the time relationship between the pseudo-stepped upshift control and the engine torque reduction control instructing torque reduction of the engine 1 is explained.

FIG. 2 is a time chart showing an example of the contents of the pseudo-stepped upshift control and the engine torque reduction control of this embodiment, where (a) shows the time change of a target primary rotation speed Npri_t and the actual primary rotation speed Npri_r, (b) shows the time change of a reached pulley ratio Rp_a, a target pulley ratio Rp_t, and an actual pulley ratio Rp_r, (c) shows the time change of a demand torque To_d and an actual torque To_r, (d) shows the time change of an actual primary pressure Ppri_r and an actual secondary pressure Psec_r, and (e) shows the time change of the vehicle forward-reverse acceleration level Gv. The horizontal axis shows the transition of time in the left to right direction, and the time axis of (a) to (e) are matched.

For example, when an operation of stepping on the accelerator pedal is done and the accelerator opening level is increased gradually, in a state in which the accelerator opening level AP is the prescribed threshold value ATH or greater under the condition of the aforementioned condition 2 and condition 3 being established, and condition 1 is also established, the pseudo-stepped upshift mode is selected. Also, until the actual primary rotation speed Npri_r is increased and reaches the prescribed upshift start rotation speed NpriTH, the gear shift ratio is held to be approximately constant, and if the actual primary rotation speed Npri_r is increased and reaches the prescribed upshift start rotation speed NpriTH, the upshift control is implemented.

In this case, as shown in FIG. 2 (b), the reached pulley ratio (reached gear shift ratio) Rp_a is set according to the gear shift ratio after the upshift, but there is a limit to the response speed of the CVT 100, and considering this response speed limit of the CVT 100, the target pulley ratio (target gear shift ratio) Rp_t that approaches this reached pulley ratio Rp_a is set at each control cycle, controlling the pulley ratio (gear shift ratio) Rp of the CVT 100. During upshifting (during gear shifting), the change in the vehicle speed is small and can be thought of as approximately constant, so it is possible to give the reached pulley ratio (reached gear shift ratio) Rp_a as shown in FIG. 2 (b).

In FIG. 2 (b), the setting timing of the reached pulley ratio Rp_a is matched with the start timing $t_a$ of the upshift control for which the actual primary rotation speed Npri_r reaches the upshift start rotation speed NpriTH, but setting of the reached pulley ratio Rp_a can also be before the start timing of the upshift control.

Also, control of the pulley ratio (gear shift ratio) Rp of the CVT 100, as shown in FIG. 2 (d), is performed by setting a primary instruction pressure Ppri_d according to the target pulley ratio Rp_t, and controlling the primary pressure Ppri using this primary instruction pressure Ppri_d, but since the actual pulley ratio (actual gear shift ratio) Rp_r changes with a response of the actual primary pressure (actual primary pressure) Ppri_r to instructions by the primary instruction pressure Ppri_d, a time difference occurs due to a response delay of the CVT 100.

Meanwhile, there is also a response delay for the torque of the engine 1, and as shown in FIG. 2 (c), a time difference occurs from instruction of the torque reduction of the engine 1 until the actual reduction of the torque of the engine 1. Therefore, to implement the torque reduction command so as to have the reduction of the torque of the engine 1 actually start before the point in time when upshifting actually starts, it is necessary to consider the response delay of the gear shift of the CVT 100 and the response delay of the torque of the engine 1. These responses delays can be ascertained for each of various types of status using advance testing, etc.

To realize this kind of time relationship between the start of torque reduction of the engine 1 and the start of upshifting, the torque reduction command of the engine 1 is started at the point in time $t_a$ when the actual primary rotation speed Npri_r increases and reaches the upshift start rotation speed NpriTH. The reduction in the torque of the engine 1 is actually started with a time difference of an amount of the response delay of the engine 1 according to that status with respect to this command start, so it is possible to estimate a time $t_e$ at which the reduction of the engine torque actually starts.

In comparison to this, it is also acceptable for the upshifting to actually start at time $t_t$ after a prescribed amount of time from the time $t_c$ when the reduction of the engine torque actually starts, and also acceptable for the upshift command of the CVT 100, specifically, the change in the target pulley ratio (target gear shift ratio) Rp_t for upshifting, to start at time $t_b$ earlier by an amount of the response delay of the CVT 100 according to that status. Each timing of these times $t_a$, $t_b$, $t_c$, $t_t$ and the times described later, times $t_d$, $t_e$, $t_f$ shown in FIG. 2 are examples, and are changed according to the status of the engine 1 and the CVT 100.

In this way, at the time $t_a$ when the actual primary rotation speed Npri_r reaches the upshift start rotation speed NpriTH, by calculation, it is possible to derive the time $t_c$ at which the reduction of the engine torque actually starts, the time h as which upshifting actually starts, and the time $t_b$ at which the upshift command of the CVT 100 starts, and it is possible to start the reduction of the torque of the engine 1 before the time when the upshifting actually starts by the first prescribed time amount.

In particular, with this embodiment, as shown in FIG. 2 (c), the torque reduction command of the engine has: a first command that decreases the command torque in step form by the prescribed torque reduction amount, and holds for a second prescribed time (time $t_a$ to time $t_d$); and after that, a second command that, after the command torque is increased in step form by minute prescribed torque increase amounts, does a gradual increase, and returns the torque of the engine 1 to the torque according to the accelerator opening level (time $t_d$ to time $t_f$).

According to the first command, decreasing all at once in step form by a prescribed torque reduction amount that is greater than the amount of inertia torque generated during upshifting and holding for the second prescribed time is in order to promote the response of the torque reduction of the engine 1 side by giving a large torque reduction mount, and also, as shown in FIG. 2 (e), to give a desired change to the forward-reverse acceleration level Gv of the vehicle by the torque reduction of the engine 1 (specifically, to generate a desired pullback of the vehicle forward-reverse acceleration level Gv immediately prior to the inertia phase of the upshifting). In light of that, the reduction torque decreased all at once in step form is also called pullback torque.

According to the second command, gradually increasing after increasing the command torque in step form by a minute prescribed torque increase amount is in order to create a situation for rising of the vehicle forward-reverse acceleration level Gv immediately after the vehicle forward-reverse after acceleration level Gv decreases at time $t_d$, emphasizing the so-called "pullback of forward-reverse after acceleration level Gv," and giving the driver an impression of snappier gear shifting.

With this embodiment, when performing a gradual increase of the command torque with the second command, at the time $t_f$ at which the command torque approaches within a prescribed range to the demand torque after shifting up, it is increased in step form and returned to the demand torque after shifting up. This is because if the command torque approaches the demand torque to a certain degree, torque shock does not occur even when increased in step form.

The prescribed time for holding in a state reduced by a prescribed torque reduction amount with the first command (time from time $t_a$ to time $t_d$) can be fixed or can be variable. When making this variable, the same as with the prescribed torque reduction amount, the larger that the accelerator opening level immediately prior to upshifting is, the longer prescribed time is set.

Also, the prescribed torque increase amount for increasing in step form or the increase rate for the gradual increase thereafter can be fixed or can be variable. When making this variable, the same as with the prescribed torque reduction amount, the larger that the accelerator opening level immediately prior to upshifting is, the larger the prescribed torque increase amount and also the increase rate are set.

Furthermore, the amount of increasing in step form when returning to the demand torque after shifting up by increasing in step form can also be fixed or variable. When making this variable, the larger that the prescribed torque reduction amount and the accelerator opening level are, the larger the amount of increasing in step form is set.

Also, though it depends on the first command prescribed torque reduction amount or prescribed time, the second command prescribed torque increase amount or increase rate for performing gradual increase thereafter, or the amount of increasing in step form thereafter, upshifting of the gear shift ratio essentially is completed at time $t_o$ when the second command is being implemented.

[4. Operation and Effect]

Figure 3:
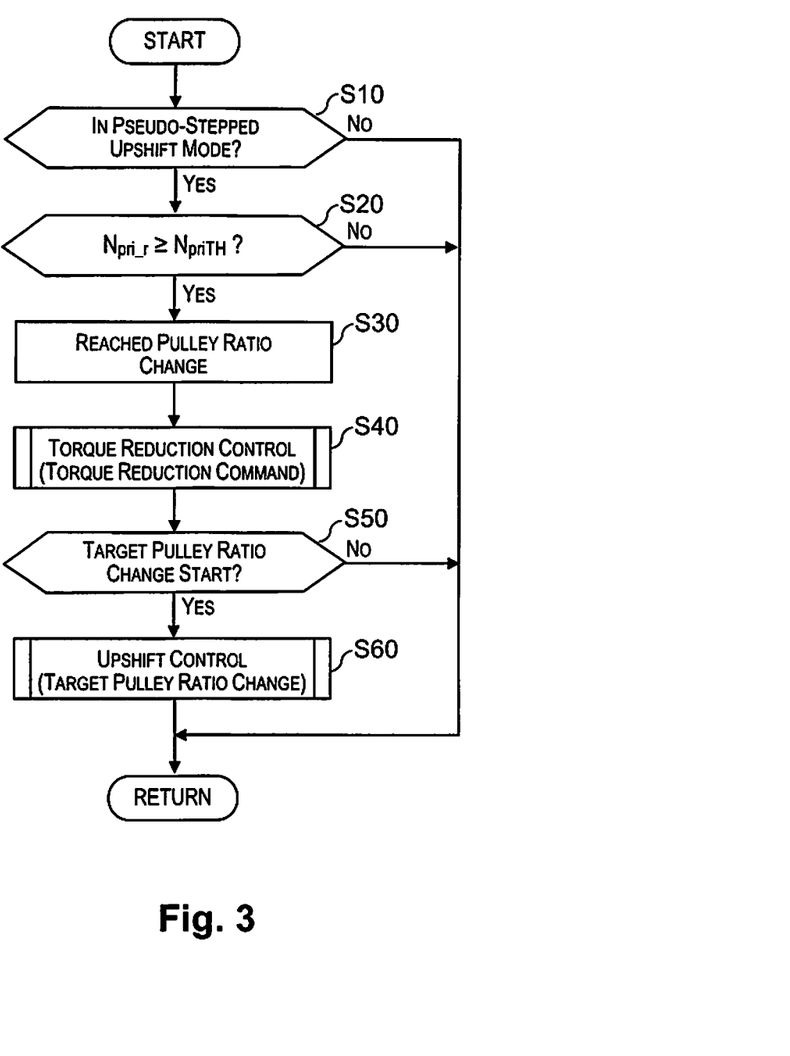
FIG. 3 is a flow chart for explaining the pseudo-stepped upshift control and the engine torque reduction control of an embodiment of the present invention.

The gear shift control device for a continuously variable transmission of an embodiment of the present invention is configured as described above, so it is possible to implement pseudo-stepped upshift control and engine torque reduction control as shown in the flow chart of FIG. 3, for example, using the CVTECU 8. This flow chart is implemented repeatedly at prescribed calculation periods.

As shown in FIG. 3, a determination is made of whether in the pseudo-stepped upshift mode (step S10). In other words, a determination is made of whether all of condition 1, condition 2, and condition 3 are established. If not in the pseudo-stepped upshift mode, this goes to Return, and if in the pseudo-stepped upshift mode, a determination is made of whether the actual primary rotation speed Npri_r has reached the upshift start rotation speed NpriTH (step S20).

If the actual primary rotation speed Npri_r has not reached the upshift start rotation speed NpriTH, this goes to Return, and if the actual primary rotation speed Npri_r has reached the upshift start rotation speed NpriTH, the reached pulley ratio Rp_a is set (step S30), and also, torque reduction control (torque reduction command) of the engine 1 is implemented (step S40). If the torque reduction control undergoes a start command, the first control and the second control are executed in sequence as described above using a torque reduction control routine that is not illustrated.

Also, a determination is made of whether this is the timing for starting changing of the target pulley ratio (target gear shift ratio) Rp_t, specifically, whether it is the start timing of the upshift command (step S50). As described previously, the time $t_b$ for starting the upshift command of the CVT 100 is derived with the time $t_a$ at which the upshift start rotation speed NpriTH is reached as a reference, and the start timing is determined.

The gear shift ratio is held until the change start timing of the target pulley ratio Rp_t (start timing of the upshift command), and if the change start timing of the target pulley ratio Rp_t (start timing of the upshift command) is reached, the pulley ratio (gear shift ratio) Rp is changed while changing the target pulley ratio Rp_t to upshift.

Working in this way, by implementing pseudo-stepped upshift control that increases vehicle speed while repeating holding of the gear shift ratio and relatively rapid stepped upshifting using the pseudo-stepped upshift control, when performing a stepped gear shift ratio change similar to stepped transmission upshifting, in conduction with this, torque control command that reduces the torque of the engine 1 before the actual start of the upshifting is performed, so pullback of the vehicle forward-reverse acceleration level Gv immediately prior to the upshift inertia phase is generated, and it is possible to implement upshifting that has a snappy sense like that of a stepped transmission.

In particular, the torque reduction start timing and the torque reduction amount are set so as to generate pullback of the vehicle forward-reverse G that gives the desired snappy sense, so it is possible to realize upshifting with a snappy sense closer to that of a stepped transmission.

Also, the torque reduction command of the engine 1 first decreases the torque of the engine 1 in step form by a prescribed torque reduction amount and holds for a second prescribed time (first command), and thereafter, after increasing in step form in minute prescribed torque increase amounts, gradually increasing and returning to the torque according to the load demand of the engine 1 (second command), so from this point as well, it is possible to realize upshifting that has a snappy sense close to that of a stepped transmission.

[5. Other]

Above, an embodiment of the present invention was explained, but the present invention is not limited to the embodiment noted above, and it is also possible to implement this with various modifications in a range that does not stray from the gist of the present invention.

For example, with the embodiment noted above, in the pseudo-stepped upshift mode, to reduce the torque of the engine 1 before the upshifting actually starts, there is a slight delay from the time that the actual primary rotation speed Npri_r reaches the prescribed upshift start rotation speed NpriTH, and there is a switch from holding of the gear shift ratio to upshifting, but assuming this delay, it is also possible to reduce and correct the upshift start rotation speed NpriTH by a minute amount and use this for determination.

The invention claimed is:

1. A gear shift control device for a continuously variable transmission of a vehicle configured to steplessly and continuously change and output a rotation speed of an engine, the gear shift control device for a continuously variable transmission comprising:
    a gear shift control unit configured to implement a pseudo-stepped upshift control to change a gear shift ratio in steps when upshifting the continuously variable transmission; and
    a torque control command unit configured to output a torque reduction command so as to reduce an engine torque in conjunction with the pseudo-stepped upshift control so that reduction of the engine torque starts before a point in time when an actual gear shift ratio starts changing in response to an upshift command,
    the torque control command unit being further configured to output the torque reduction command such that a start timing of the upshift command and a start timing of the torque reduction command are set so that the reduction of the engine torque starts by a first prescribed time before the point in time when the actual gear shift ratio starts changing, according to a response time from the upshift command until the actual gear shift ratio starts changing, and a response time from the torque reduction command to the engine until the reduction of the engine torque actually starts, the start timing of the upshift command being determined, at the start timing of the torque reduction command, to be a point in time that is after the start timing of the torque reduction command and before the point in time when the actual gear shift ratio starts changing.

2. The gear shift control device for a continuously variable transmission according to claim 1, wherein
    the torque control command unit is configured to output the torque reduction command such that a torque reduction amount according to the torque reduction command is a prescribed torque reduction amount that is greater than an inertia torque amount generated during the upshifting.

3. The gear shift control device for a continuously variable transmission according to claim 2, wherein
    the torque control command unit is configured to output the torque reduction command such that the greater a load demand of the engine immediately prior to the upshifting, the greater the prescribed torque reduction amount is set.

4. The gear shift control device for a continuously variable transmission according to claim 2, wherein
    the torque control command unit is configured to output the torque reduction command such that the torque reduction command of the engine includes: a first command for decreasing a command torque in step form by the prescribed torque reduction amount and holding for a second prescribed time; and a second command outputted after the first command for, after increasing the command torque in step form by a minute prescribed torque increase amount, gradually increasing and returning the engine torque to a torque according to the load demand of the engine.

5. A gear shift control method for a continuously variable transmission of a vehicle configured to steplessly and continuously change and output a rotation speed of an engine, the gear shift control method comprising:
    when upshifting the continuously variable transmission, implementing a pseudo-stepped upshift control for changing a gear shift ratio in steps when in a prescribed condition; and
    in conjunction with the pseudo-stepped upshift control, performing torque control to reduce an engine torque when in each of stepped upshifts, the torque control implementing a torque reduction command so that reduction of the engine torque starts before a point in time when an actual gear shift ratio starts changing in response to an upshift command,
    the torque reduction command being outputted such that a start timing of the upshift command and a start timing of the torque reduction command are set so that the reduction of the engine torque starts by a first prescribed time before the point in time when the actual gear shift ratio starts changing, according to a response time from the upshift command until the actual gear shift ratio starts changing, and a response time from the torque reduction command to the engine until the reduction of the engine torque actually starts, the start timing of the upshift command being determined, at the start timing of the torque reduction command, to be a point in time that is after the start timing of the torque reduction command and before the point in time when the actual gear shift ratio starts changing.

6. A gear shift control device for a continuously variable transmission of a vehicle configured to steplessly and continuously change and output a rotation speed of an engine, the gear shift control device for a continuously variable transmission comprising:

- a gear shift control means for implementing a pseudo-stepped upshift control for changing a gear shift ratio in steps when upshifting the continuously variable transmission; and
- a torque control command means for outputting a command so as to reduce a torque of the engine in conjunction with the pseudo-stepped upshift control, the torque control command means implementing a torque reduction command so that reduction of an engine torque starts before a point in time when an actual gear shift ratio starts changing in response to an upshift command, the torque control command means further outputting the torque reduction command such that a start timing of the upshift command and a start timing of the torque reduction command are set so that the reduction of the engine torque starts by a first prescribed time before the point in time when the actual gear shift ratio starts changing, according to a response time from the upshift command until the actual gear shift ratio starts changing, and a response time from the torque reduction command to the engine until the reduction of the engine torque actually starts, the start timing of the upshift command being determined, at the start timing of the torque reduction command, to be a point in time that is after the start timing of the torque reduction command and before the point in time when the actual gear shift ratio starts changing.

* * * * *